United States Patent Office 3,271,133
Patented Sept. 6, 1966

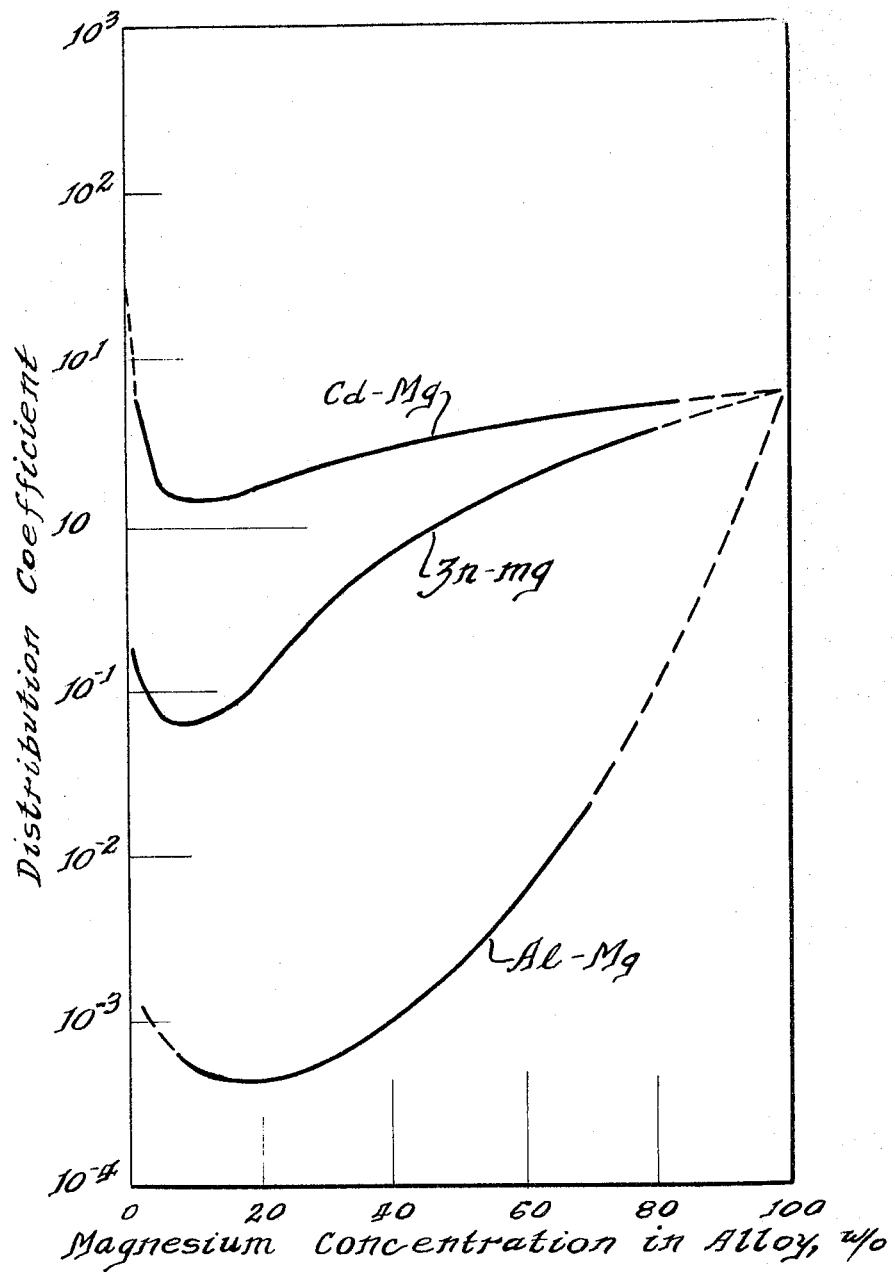

3,271,133
PURIFICATION OF MOLTEN SALTS
James B. Knighton, Joliet, and Robert K. Steunenberg, Naperville, Ill., assignors to the United States of America as represented by the United States Atomic Energy Commission
Filed June 29, 1965, Ser. No. 468,169
6 Claims. (Cl. 75—84.1)

The invention described herein was made in the course of, or under, a contract with the United States Atomic Energy Commission.

This invention relates to the purification of molten halides used in a pyrometallurgical process for separating uranium, plutonium and rare-earth fission products and particularly to the removal and consolidation of rare-earth fission products therefrom.

Small quantities of plutonium together with various fission products are found in neutron-irradiated uranium employed in the blanket or core of a breeder reactor. This blanket or core material must be processed periodically to recover plutonium therefrom and to remove fission products therefrom.

Various pyrometallurgical processes have been suggested for this purpose. For example, uranium and plutonium may be extracted from a molten halide solution with a binary alloy of copper and magnesium. Also U.S. Patent No. 3,169,057, granted February 9, 1965 to James B. Knighton and Robert K. Steunenberg, discloses use of a binary alloy of zinc and magnesium as extractant. According to this patent a neutron-irradiated nuclear fuel is dissolved in a molten halide flux and uranium and plutonium are extracted therefrom by contacting the molten halide with a binary alloy of magnesium and zinc. A molten halide flux which contains highly radioactive fission products is thus obtained as a byproduct of these processes. Not only is it desirable to purify the molten halide flux for reuse as solvent for the nuclear fuel because of the cost of the salts employed but also it is desirable to remove the fission products from the flux because disposal of the intensely radioactive material would create problems.

It is accordingly an object of the present invention to develop a method of purifying a molten halide flux.

It is also an object of the present invention to develop a method of removing rare-earth fission products from a molten halide flux.

It is a further object of the present invention to develop a method of removing and disposing of fission products contained within a molten halide flux.

It is another object of the present invention to develop a method of concentrating fission products in a safe, low-volume form for disposal or use.

These and other objects of the present invention are attained by extracting rare-earth fission products from a molten halide flux with a liquid alloy of aluminum and magnesium. Fission products can be extracted, for example, from any of the fluxes found useful in the process described in the above-identified patent, that is, pure magnesium halide or a mixture of magnesium halide with alkali metal halide or alkaline earth halide. For instance, this invention can be applied to remove fission products from an equimolar mixture of lithium chloride and magnesium chloride, melting at about 600° C., or a mixture of 30 mole percent sodium chloride, 20 mole percent potassium chloride and 50 mole percent magnesium chloride, melting at about 390° C. As will become apparent hereinafter, while an alloy of aluminum and magnesium can be used as extractant, other alloys tested cannot be so used.

The process of this invention broadly comprises adding the liquid magnesium-aluminum alloy to the molten halide flux whereby the rare-earth fission products are extracted therefrom with a high degree of selectivity, separating the salt and metal alloy and casting the metal alloy within a corrosion-resistant material such as stainless steel, titanium or zirconium for permanent disposal.

The distribution of praseodymium—taken as representative for the rare-earth family of fission products as it provides the most difficult plutonium-rare earth separation—between 30 mole percent sodium chloride—20 mole percent potassium chloride—50 mole percent magnesium chloride and various magnesium alloys at 600° C. is shown in the accompanying drawing. This drawing indicates that an alloy of aluminum and magnesium containing between 10 and 30% of magnesium could be used to extract praseodymium from the molten salt flux and that the other alloys could not be used for this purpose. In fact, the driving force for moving the praseodymium from salt to metal is about 200 times greater than that for a zinc-magnesium alloy. This result is completely unexpected and unpredictable.

A series of experiments has been carried out to determine the distribution of various fission products including praseodymium between 30 mole percent sodium chloride—20 mole percent potassium chloride—50 mole percent magnesium chloride and aluminum—20 weight percent magnesium alloy and also the solubilities of these elements in this alloy. The distribution coefficients and solubilities were determined by adding these elements individually to the molten halide flux and equilibrating for an hour. Other experiments have shown that these elements do not have an effect on each other as to their distribution so that conclusions drawn from the individual cases can be extended to the behavior of the elements in a mixture such as neutron-bombarded nuclear fuel.

The distribution coefficients of yttrium, lanthanum, cerium and praseodymium between 30 mole percent sodium chloride—20 mole percent potassium chloride—50 mole percent magnesium chloride and aluminum—20 weight percent magnesium are given in the following table.

*Table I*

| Element | Kd = (w/o in salt)/w/o in metal) | |
|---|---|---|
| | 500° C. | 600° C. |
| Yttrium | $2.42 \times 10^{-3}$ | $4.93 \times 10^{-3}$ |
| Lanthanum | $2.82 \times 10^{-3}$ | $7.03 \times 10^{-3}$ |
| Cerium | $4.12 \times 10^{-4}$ | $7.08 \times 10^{-4}$ |
| Praseodymium | | $4.4 \times 10^{-4}$ |

Distribution coefficients into aluminum—13 weight percent magnesium and aluminum—30 weight percent magnesium were also determined and show that both of these alloys were satisfactory. The range of suitable alloys is thus between about 10 percent to 30 percent magnesium with 20 percent magnesium being preferred.

The solubilities of these same elements in the alloy were also determined.

*Table II*

| Element | Solubility (w/o) | |
|---|---|---|
| | 550° C. | 600° C. |
| Yttrium | 0.91 | 3.45 |
| Lanthanum | 2.23 | 4.65 |
| Cerium | 2.24 | 3.27 |
| Praseodymium | 2.53 | 3.91 |

It is thus clear that the rare-earth fission products are readily extracted from a molten salt flux by an alloy consisting of from about 10 to about 30 weight percent magnesium, the balance being aluminum. Extensive experimentation by the present inventors and others shows that these results can be extended to the extraction of rare earth fission products in general from any of the described molten salt fluxes.

It will be understood that the invention is not to be limited to the details given herein but that it may be modified within the scope of the appended claims.

What is claimed is:

1. A process of purifying a fused salt containing fission products comprising contacting said fused salt with a binary alloy of aluminum and magnesium whereby essentially all of the rare-earth fission products are extracted into the binary alloy, and separating the salt and metal phases.

2. The process of claim 1 wherein the alloy contains from 10 to 30 percent magnesium.

3. The process of claim 1 wherein the alloy contains 20 percent magnesium.

4. The process of claim 1 wherein the fused salt consists of a mixture of alkali and alkaline earth chlorides.

5. The process of claim 1 wherein the fused salt consists of 30 mole percent sodium chloride, 20 mole percent potassium chloride and 50 mole percent magnesium chloride.

6. The process of claim 1 wherein the temperature is 550 to 600° C.

References Cited by the Examiner
UNITED STATES PATENTS

| | | | |
|---|---|---|---|
| 2,931,721 | 4/1960 | Lyon | 75—84.1 |
| 2,934,425 | 4/1960 | Knighton et al. | 75—84.1 |
| 2,948,586 | 8/1960 | Moore | 75—84.1 X |
| 3,034,889 | 5/1962 | Spedding et al. | 75—84.1 |
| 3,063,830 | 11/1962 | Martin et al. | 75—84.1 |
| 3,099,555 | 7/1963 | Teitel | 75—84.1 |
| 3,120,435 | 2/1964 | Chiotte | 75—84.1 |
| 3,169,057 | 2/1965 | Knighton et al. | 75—84.1 |

References Cited by the Applicant

TID–8540, pp. 411–76 (ANL) (NSA 18:33683).

BENJAMIN R. PADGETT, *Acting Primary Examiner.*

M. J. SCOLNICK, *Assistant Examiner.*